(12) United States Patent
Maturana et al.

(10) Patent No.: US 6,272,391 B1
(45) Date of Patent: *Aug. 7, 2001

(54) SELF ORGANIZING INDUSTRIAL CONTROL SYSTEM IMPORTING NEIGHBOR CONSTRAINT RANGES

(75) Inventors: Francisco P. Maturana; Rebecca J. Herr, both of Twinsburg; David A. Vasko, Macedonia, all of OH (US)

(73) Assignee: Rockwell Technologies, LLC, Thousand Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/261,275

(22) Filed: Mar. 3, 1999

Related U.S. Application Data

(63) Continuation-in-part of application No. 09/164,204, filed on Sep. 30, 1998, now Pat. No. 6,091,998.

(51) Int. Cl.[7] .................................................. G06F 19/00
(52) U.S. Cl. ............................................. 700/103; 700/109
(58) Field of Search ................................ 700/95, 97, 100, 700/101, 102, 103, 105, 109, 115, 116

(56) References Cited

U.S. PATENT DOCUMENTS

| | | | |
|---|---|---|---|
| 5,216,593 | * 6/1993 | Dietrich et al. ...................... | 345/467 |
| 5,280,425 | * 1/1994 | Hogge .................................. | 712/300 |
| 5,353,229 | * 10/1994 | Tanaka ................................. | 700/103 |
| 5,406,476 | * 4/1995 | Deziel et al. ........................ | 705/8 |
| 5,659,478 | * 8/1997 | Pennisi et al. ....................... | 700/95 |
| 5,808,891 | * 9/1998 | Lee et al. ............................. | 700/108 |
| 5,845,258 | * 12/1998 | Kennedy .............................. | 705/8 |
| 5,909,368 | * 6/1999 | Nixon et al. .......................... | 700/2 |
| 5,912,678 | * 6/1999 | Saxena et al. ....................... | 700/103 |
| 5,946,212 | * 8/1999 | Bermon et al. ...................... | 700/97 |
| 5,950,170 | * 9/1999 | Pan et al. ............................. | 705/7 |
| 5,953,229 | * 9/1999 | Clark et al. .......................... | 700/100 |
| 6,091,998 | * 7/2000 | Vasko et al. ......................... | 700/100 |
| 6,094,955 | * 8/2000 | Vasko et al. ......................... | 72/7.2 |

* cited by examiner

*Primary Examiner*—William Grant
*Assistant Examiner*—Chad Rapp
(74) *Attorney, Agent, or Firm*—Keith M. Baxter; Alexander M. Gerasimow; William R. Walbrun

(57) ABSTRACT

An industrial control system uses a number of autonomous control units, each associated with one piece of equipment in an industrial process. The autonomous control units include data indicating not only their constraints of operation but also reflecting the constraints of operation of machines to which they are attached and with which they share common operating parameters. An autonomous controller associated with a machine having operating parameters in common with another machine adopts the intersection of the ranges of the machine constraint of the two machines. Machine constraints are preserved to the extent possible as ranges so as to permit flexibility in selecting and seeking goals by the individual autonomous control units.

11 Claims, 6 Drawing Sheets

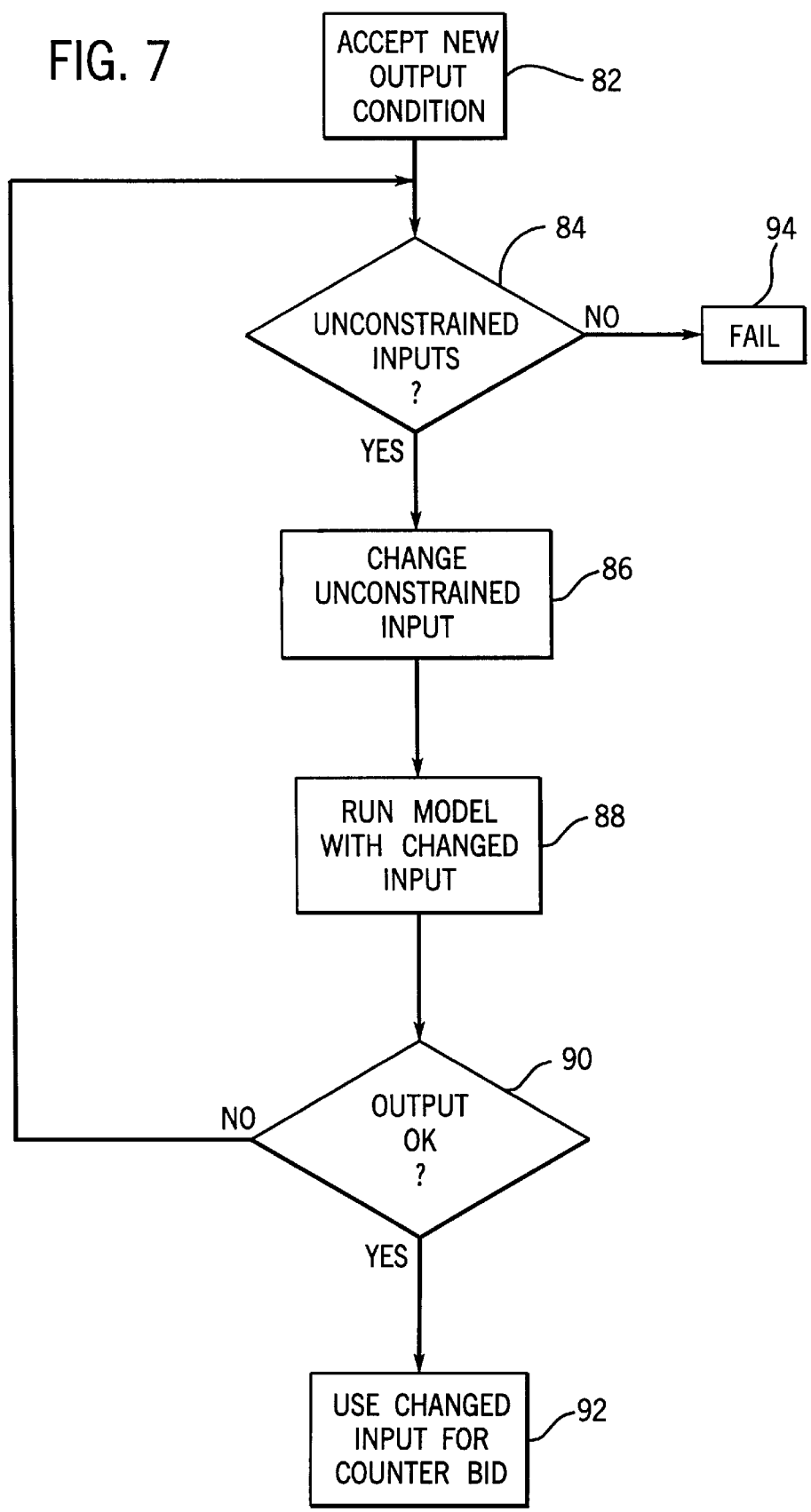

SELF ORGANIZING INDUSTRIAL CONTROL SYSTEM IMPORTING NEIGHBOR CONSTRAINT RANGES

CROSS-REFERENCE TO RELATED APPLICATIONS

This application is a continuation-in-part of U.S. application Ser. No. 09/164,204 filed Sep. 30, 1998, now U.S. Pat. No. 6,091,998 filed Jul. 18, 2000 and entitled: Self-Organizing Industrial Control System Using Bidding Process.

STATEMENT REGARDING FEDERALLY SPONSORED RESEARCH OR DEVELOPMENT

BACKGROUND OF THE INVENTION

The present invention relates to industrial controllers for the real-time control of equipment used in manufacturing and in particular to an industrial controller that automatically organizes equipment for the manufacture of a products based on the capabilities of the equipment.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

Unlike the standardized software normally executed on conventional computers, the control program executed on an industrial controller is normally unique to each controlled process. The writing and troubleshooting of the control program is thus a significant cost in the creation of an industrial control system. After the controlled program is complete, it must often be modified as the product to be manufactured changes or as equipment is exchanged, replaced or repaired.

The above referenced parent to this application describes a self-configuring industrial control system employing a number of autonomous control units, each associated with a particular piece of manufacturing equipment. The autonomous control units are programmed with data describing the capabilities of their equipment and the equipment's ability to interact with other equipment. A desired product is described in a "job description language" and broadcast to the autonomous control units, each which identifies portions of the job that they can complete. The autonomous control units then exchange bids and counterbids with the other autonomous control units to allocate the job among units and to select the desired operating parameters of the associated equipment. The autonomous control units are programmed with generalized goals so that the allocation may be further optimized for high productivity, low cost or some other objective measure.

The bidding process accommodates competing goals of the different pieces of equipment. Nevertheless, this bidding process can be quite time consuming and in certain instances, can disproportionately allocate resources to downstream equipment whose counterbids drive the ultimate job plan produced.

BRIEF SUMMARY OF THE INVENTION

The present invention simplifies the bidding process through the use of an initial exchange of operational constraints between each autonomous controller. In this exchange step, the autonomous controllers compare the ranges of their machines' inputs and outputs to the corresponding ranges of connected input and outputs of predecessor and successor machines. By internalizing these ranges, the bidding process is substantially simplified. Further, to the extent possible, inconsistencies in the ranges are remedied by producing new ranges rather than individual values. In this way, local choices in the optimization provided by the bidding process is preserved.

Specifically, the present invention provides an industrial control system for controlling an industrial process of interconnected machines operating to produce a manufactured product according to a job plan. The industrial control includes a plurality of interconnected autonomous control units, one associated with each machine, each having an electronic memory. The electronic memory holds data representing machine constraints indicating constraints on the operation of a given machine resulting from limitations of the machine and inter-machine relationships indicating physical operating parameters of the given machine linked to the physical operating parameters of another machine. An electronic computer executes a stored program to modify the machine constraints associated with the given machine by the machine constraints of a machine related by the inter-machine relationships and evaluates the feasibility of executing a portion of a job plan for the manufacture of a product by the given machine based on the modified machine constraints.

Thus, it is one object of the invention to provide each autonomous control unit with information about constraints that may be imposed on the job plan by other machines to which the given machine may be related, for example, by shared inputs or outputs. By bringing this information into each autonomous control unit, inefficient communication between the autonomous control units is minimized and a solution to the allocation of the job plan among machines is more rapidly obtained.

The memory may hold multiple machine constraints and multiple inter-machine relationships identified to different material paths between machines. The machine constraints associated with a given material path are modified by the machine constraints of only machines related by the inter-machine relationship associated with the given material path.

Thus, it is another object of the invention to address constraints imposed by adjacent machines without unduly limiting the solution sought by the autonomous control units. By segregating constraints according to machine paths, constraints applicable to one machine path are not necessarily imputed to other machine paths.

The electronic computer may respond to a job plan and bids by other autonomous control units to create a bid for the job plan describing performance of a portion of the job plan that may be performed by the given machine according to the modified machine constraints. In the alternative, the computer may create a counterbid proposing further modification of the machine constraints. Further in response to counterbids by other autonomous control units, the electronic computer may create a modified bid for the job plan according to the modified machine constraints adjusted by the received counterbid.

Thus, it is another object of the invention to provide a method of coordinating autonomous control units to exchange machine constraint ranges that may be used in conjunction with a bid and counterbid system for producing a particular value within those constraint ranges.

The inter-machine relationships may match identical operating parameters that are inputs or outputs of interconnected machines.

Thus it is yet another object of the invention to allow upstream machines to impose their constraints on downstream machines as well as downstream machines being able to impose their input constraints on upstream machines thereby improving knowledge of each machine as to the restraints of the overall process.

The machine constraints may be ranges of operating parameters for the given machine and the modification of the machine constraints may produce a multivalue range of operating parameters that is a subset of the range of operating parameters.

Thus it is another object of the invention to preserve the machine constraints as ranges of values rather than individual values to allow greatest freedom within an individual autonomous control unit for local optimization.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 7 is a flow chart of the operation of the model of FIG. 3 and 4 in the responding to a counter-bid per the flow chart of FIG. 6.

DETAILED DESCRIPTION OF THE INVENTION

Components of the Control System

Figure 1:
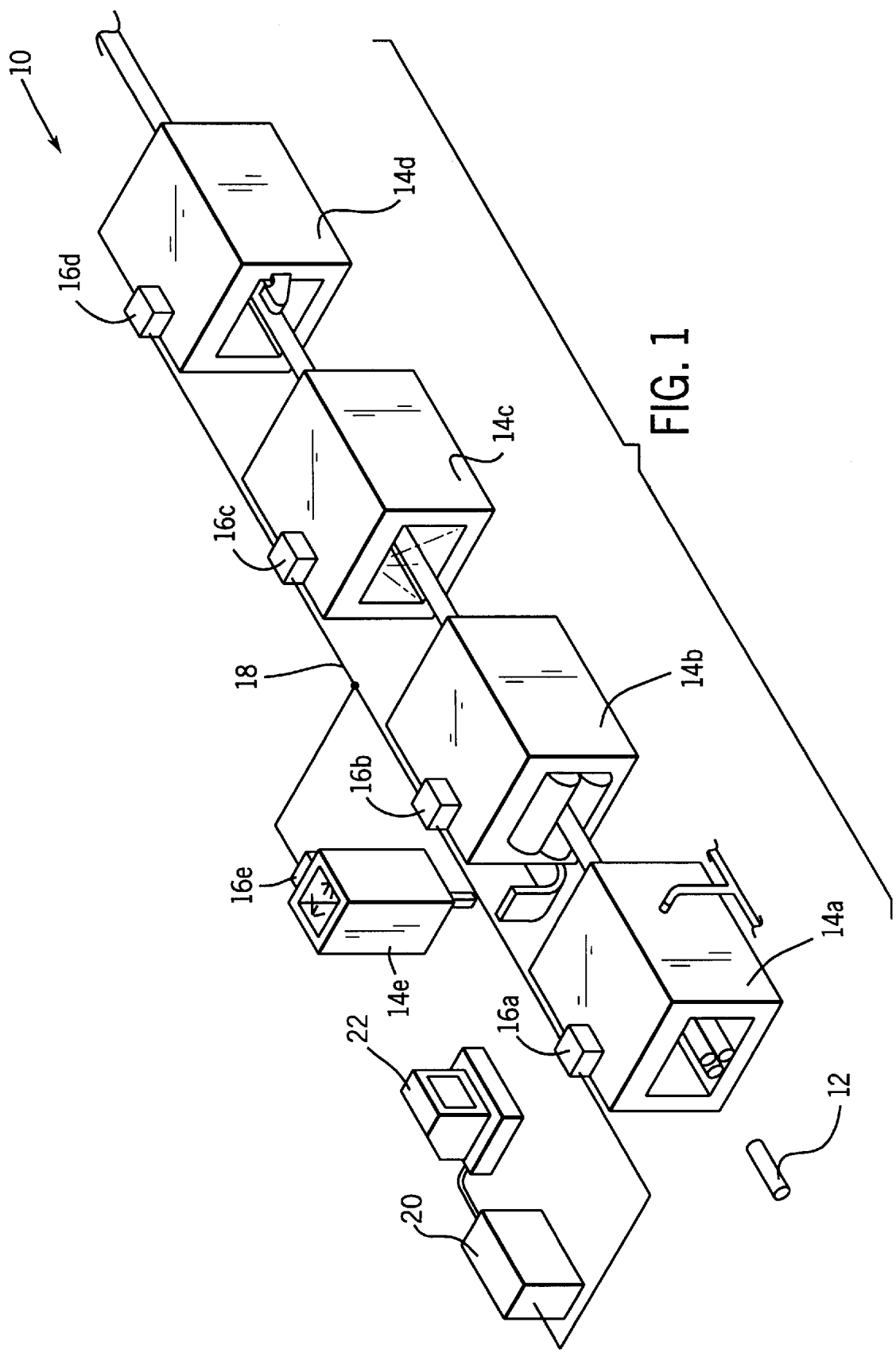
FIG. 1 is a perspective view of a simplified rolling mill composed of a sequential set of machines each associated with an autonomous control unit per the present invention.

Referring now to FIG. 1, an industrial process 10 may provide for the processing of metal billets 12 through a series of machines 14. Each machine 14 may have an associated autonomous control unit 16 being either discrete devices as shown in FIG. 1 or portions of a centralized machine. The autonomous control units 16 may be separate computers interconnected by a common communication link 18 and also connected by the communication link 18 to a controller 20 and a human/machine interface such as a computer terminal 22 of conventional design. Alternatively, the autonomous control units 16 may be partitions of controller 20 communicating with the machines 14 via sensors and actuators on the machines 14.

In an example process 10, suitable for control by the present invention, machines 14 may include a reheat furnace 14a for heating precast billets 12 to a predetermined temperature, a rolling mill 14b for rolling the billets 12 to a predetermined diameter, a water bath 14c for cooling the billets 12 with water and a Stelmor conveyor 12d cooling the billets 12 with air. The billets 12 may alternatively come directly from a continuous casting machine 14e at casting temperature without the need for reheating by reheat furnace 14a. In this case the billets pass directly from the continuous caster 14e to the rolling mill 14b.

Figure 2:
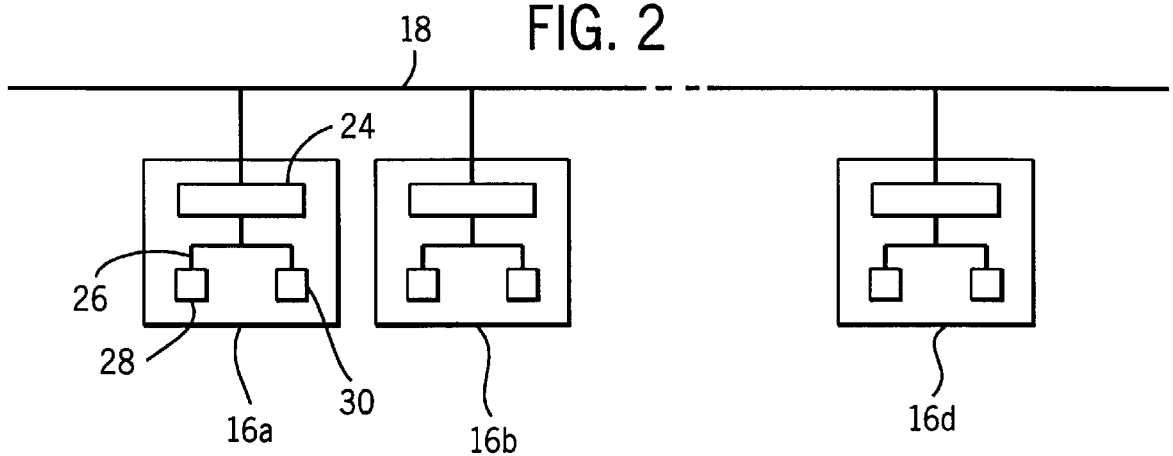
FIG. 2 is a schematic block diagram of the autonomous control units of FIG. 1 showing the inter connection of the autonomous control units through interfaces on a common link and a processors and memories of the autonomous control units.
Figure 3:
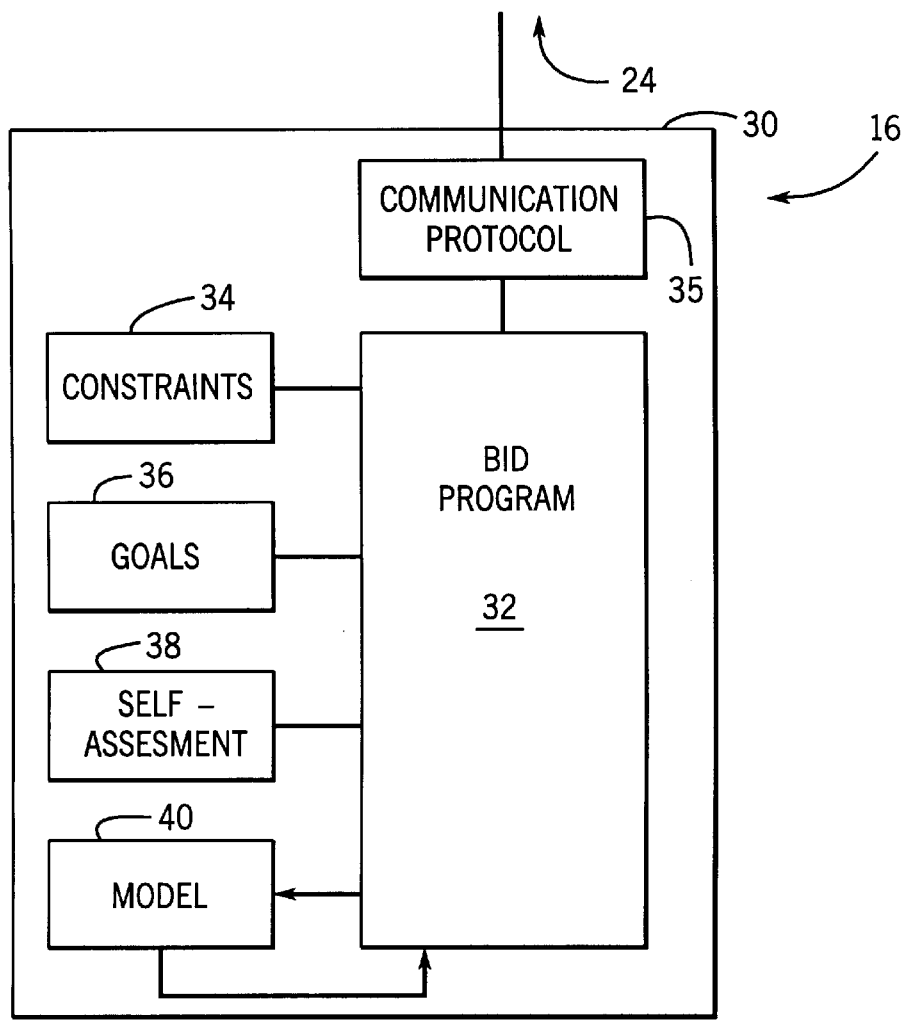
FIG. 3 is a detailed block diagram of the memory of one autonomous control unit of FIG. 2 showing the contained bid program, constraint data, goal data, self assessment data, and a model of the equipment associated with the autonomous control unit.

Referring now to FIGS. 2 and 3, each autonomous control unit 16 includes an interface circuit 24 connected with the common communication link 18 and handling communication protocols so that the autonomous control units 16 may communicate bids and counter-bids among themselves and may receive a job description as will be discussed below. The interface circuits 24 of each autonomous control unit 16 are connected by an internal bus 26 to a processor 28 and memory 30.

Data Structures

Referring now to FIG. 3, the memory 30 holds a bid program 32 that will be used to generate bids and counter-bids to be exchanged among the autonomous control units 16 in developing a control strategy for the machines 14. The bid program 32 communicates with the other autonomous control units 16 according to a communications protocol program 35 which also serves to store and sort bids and counter-bids and job descriptions and direct bids and counter-bids to the correct device as will be described.

The bid program 32 has access to stored data tables representing constraint data 34, which generally quantifies the limitations of performance of the associated machine 14, goal data 36, which describes preferences among modes of operation of the associated machine 14 within the constraints 34, self assessment data 38 generally describing the dynamic state of the associated machine, and a model 40 modeling operation of the associated machine by mathematical means.

Figure 4:
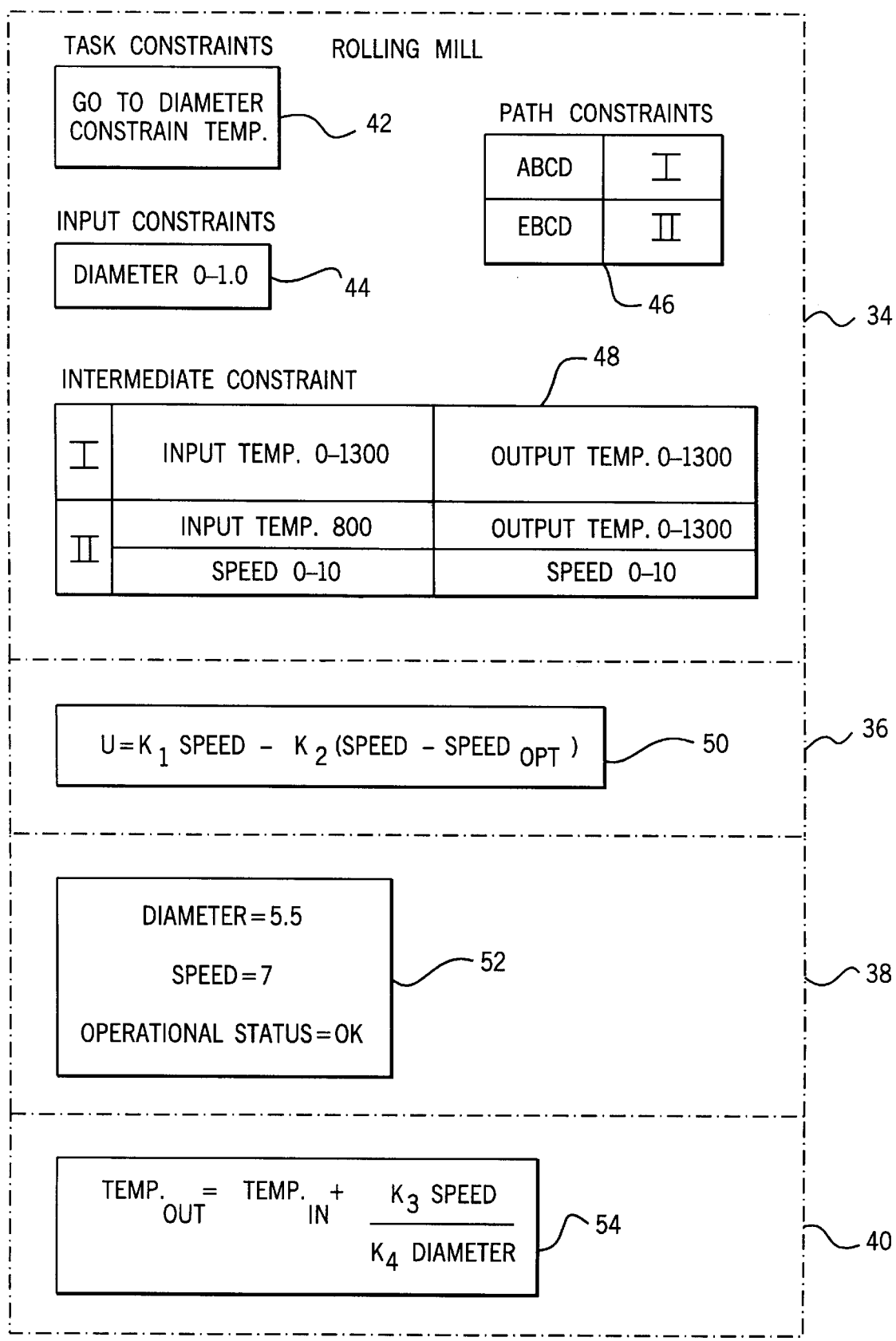
FIG. 4 is a expanded block diagram of the constraint data, goal data, self assessment data, and model of FIG. 3.

Referring to FIG. 4, the constraints 34 are of a number of different kinds. Task constraints 42 describe generally the kind of operation that the associated machine 14 is intended to perform. Thus, for example, the reheat furnace 14a may perform heating tasks (GOTO TEMP), the rolling mill 14b (as shown) may perform a diameter reduction task (GOTO DIA.). The task constraints 42 allow the autonomous control units 16 to make a threshold determination as to whether their associated machines 14 will make a bid for a particular task of a plan to produce a product. Continuing with the example of the rolling mill 14b, the autonomous control unit 16a of the rolling mill 14b will only bid for tasks requiring diameter reductions.

The constraint data also includes input constraints 44 describe the limits of the inputs to the associated machine 14. The inputs (as opposed to the outputs of the machines 14) are well defined and their ranges are set by the physical design of the machine. For example, for the rolling mill 14b the input will be amount of gas valve opening and the range of the input will be from zero to one hundred percent. For the rolling mill 14b the inputs will be rolling diameter from 0 to 1. For the water bath 14c the input will be water flow rate and for the Stelmor conveyor 14d the inputs will be air flow rate. As used herein, input constraints are only those constraints independent of the operation of other machines 14.

The constraints 34 also include path constraints 46 which generally reflect limitations on the possible paths of the product, the billet 12, between machines 14 as dictated by their physical layout. In this example, two paths are available, the first in which the billet 12 passes from reheat furnace 14a to rolling mill 14b, then to water bath 14c and finally to Stelmor conveyor 14d and the second where the billet 12 passes from continuous caster 14e to rolling mill 14b then to water bath 14c and finally to Stelmor conveyor 14d. These path topologies are reflected in the path constraints 46 listing the path in a first column and a set of intermediate constraints 48 (as will be described) in a second column. From this table all possible paths between machines 14 may be determined. The task constraints 42, the path constraints 46 and the input constraints 44 will be termed generally "operational" constraints as they constrain the operation of the machine 14 in contrast to the inter-machine constraints to be described below.

Figure 5:
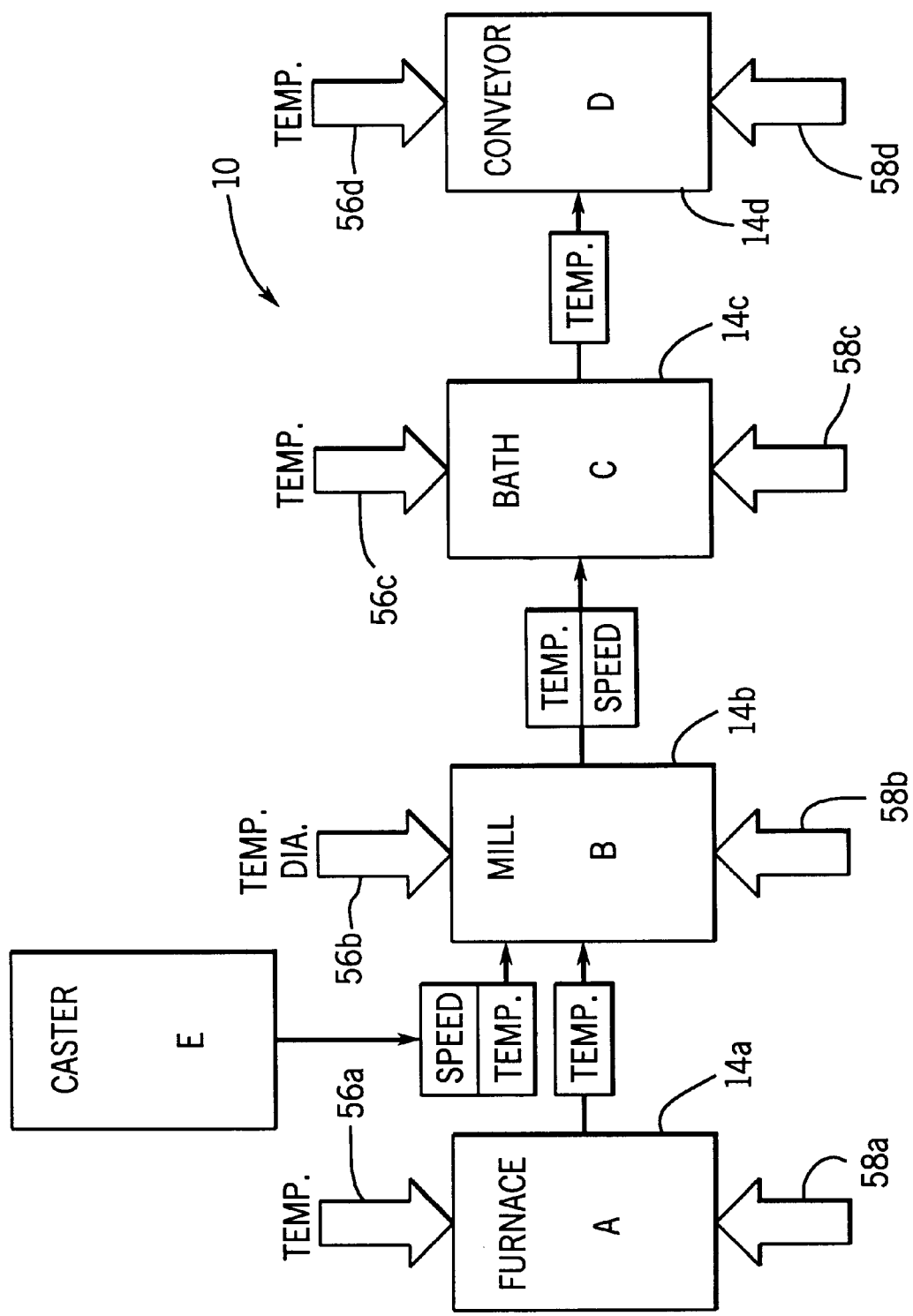
FIG. 5 is a graphical representation of the equipment of the rolling mill of FIG. 1 as defined by various inputs and constraints.

Referring also to FIG. 5, deriving from the path constraints 46 and possibly including other inputs of the machines 14 are the "inter-machine" or "intermediate" constraints 48 representing operating parameters shared between machines 14 based on the path of the material between machines 14. Generally these intermediate constraints 48 connect identical operating parameters of the machines 14 forming outputs of upstream machines in the material path with inputs of downstream machines in the material flow path. Thus the input temperature of the rolling mill 14b will be constrained to be equal to output temperature of the reheat furnace 14a or the output temperature of the continuous caster 14e depending on the particular path. The continuous caster 14e has an output speed and hence this is an inter-machine constraint for that path only. Generally, the rolling mill 14b and water box 14c also share output and input temperatures respectively, and also billet speed i.e., the speed of exit of the billet 12 from the rolling mill 14b equaling the speed of entry of the billet into the water box 14c.

As a result of the coiling of the billet product in the Stelmor conveyor 14d the water box 14c and Stelmor conveyor 14d do not share the parameter of conveyor speed but do share the parameter of temperature as the temperature of the billet output from the water box 14b will equal the temperature of the billet 12 entering to the Stelmor conveyor.

Referring again to FIGS. 3 and 4, the memory may also hold goal data 36 implemented as a utility function 50 having as input arguments one or more of the characterizing parameters of the machine 14 either inputs or outputs, and as a value an arbitrarily defined utility which reflects a preprogrammed goal of the autonomous control unit 16. In the case of the rolling mill 14b, the utility function 50 may be a function of speed reflecting a desire for high production, but also a particular speed for metallurgical reasons. A more complex utility function 50 might consider other metallurgical properties and wear on the equipment. Generally the autonomous control unit 16 strives to maximize utility within the operational and intermediate constraints.

Other machines will have other goals as selected and programmed by the user or manufacturer. The goals for the reheat furnace 14a, the water box 14c and Stelmor conveyor 14d are generally reduction of gas, water and air volume respectively.

Referring still to FIGS. 3 and 4, the self assessment data 38 will typically include various sensed parameters 52 of the associated machine 14. As shown in FIG. 4 for the rolling mill 14b, the self assessment data includes current rolling diameter and the rolling speed (sensed outputs). A general operational status for the rolling mill 14b may also be provided as generated from other inputs and outputs and possibly a heuristic program evaluating the fitness of the machine 14. Generally the self assessment data 38 is used to modify the operation constraints 34 if the operational status of the machine 14 is somehow impaired.

The model 40 provides a mathematical description 54 relating inputs to the machine 14 to its outputs. In the example of the rolling mill 14b, a simple linear equation of three variables is shown relating output temperature of the rolling mill 14b to the input temperature the rolling speed and the diameter reduction. This model reflects generally the fact that the rolling process can increase the temperature of the stock. Generally far more complex models may be created relating one or more inputs to particular outputs of the machine. In most cases, the inverse of the model function is not also a function and thus an iterative process must be used to deduce an input from an output such as a binary search using successive input values until the desired output is arrived at.

For the reheat furnace 14a, the model 40 will take into account the time integral of the gas valve opening as reflects the heating of the furnace. The model for the water box 14c may relate cooling water flow and process speed to surface and internal temperatures. The model 40 for Stelmor conveyor 14d will provide a time and air flow relationship to temperature of the output billet 12. The construction of such models is generally understood in the art and will depend on the particular machine 14.

Job Description Language

Referring now to FIGS. 1 and 5, a "product" autonomous control unit 16 may be implemented by an arbitrary controller 20 to represent the desired product to be manufactured from the billet 12. This product autonomous control unit provides a convenient unit for implementing the functions of describing the product to the autonomous control units 16 of the machines 14 and of evaluating the plans produced by the autonomous control units 16 against the product definition. For this first task, the product autonomous control unit, accepts input from a user through computer terminal 22 describing the product characteristics and produces a machine independent description of desired tasks for producing that product in a job description language. In the preferred embodiment the job description language is an ASCII text file providing a number of steps defining desired machine outputs. For example, to produce a rolled billet, the job description is as follows:

```
STEP 1=  GOTO TEMP(ALL)<1300.0
STEP 2=  GOTO DIAMETER=5.5 TOL(-0.2, 0.2)
         CONSTRAIN TEMP(ALL)<1300.0
         CONSTRAIN TEMP(ALL)>825.0 AT TIME=END
         DEPENDS ON (1)
STEP 3=  GOTO TEMP(SURF)=850 TOL(-5.0, 5.0)
         CONSTRAIN TEMP(ALL)>825.0 AT TIME=0.0
```

-continued

```
        CONSTRAIN TEMP(SURF)>450.0 AND<1300.0
        WITH DIAMETER=5.5
        DEPENDS ON (2)
STEP 4= GOTO TEMP(AVG)=650.0 TOL(-5.0, 5.0) IN TIME<15.0
        CONSTRAIN TEMP(SURF)>500 AT TIME>=0.0 AND
 <=2.0
        WITH DIAMETER=5.5
        DEPENDS ON (3)
STEP 5= GOTO TEMP(AVG)=600.0 TOL(-5.0,5.0) IN TIME >40.0
        WITH DIAMETER = 5.5
        DEPENDS ON (4)
```

Each step defines temperatures (TEMP), diameters (DIAMETER) and tolerances (TOL) of the billet and the sequence (DEPENDS ON) and timing (AT TIME) of the steps. In this example both surface temperature (SURF) and overall temperature (ALL) is considered and so the models 40 must provide outputs for both.

Operation of the Control System

Figure 6:
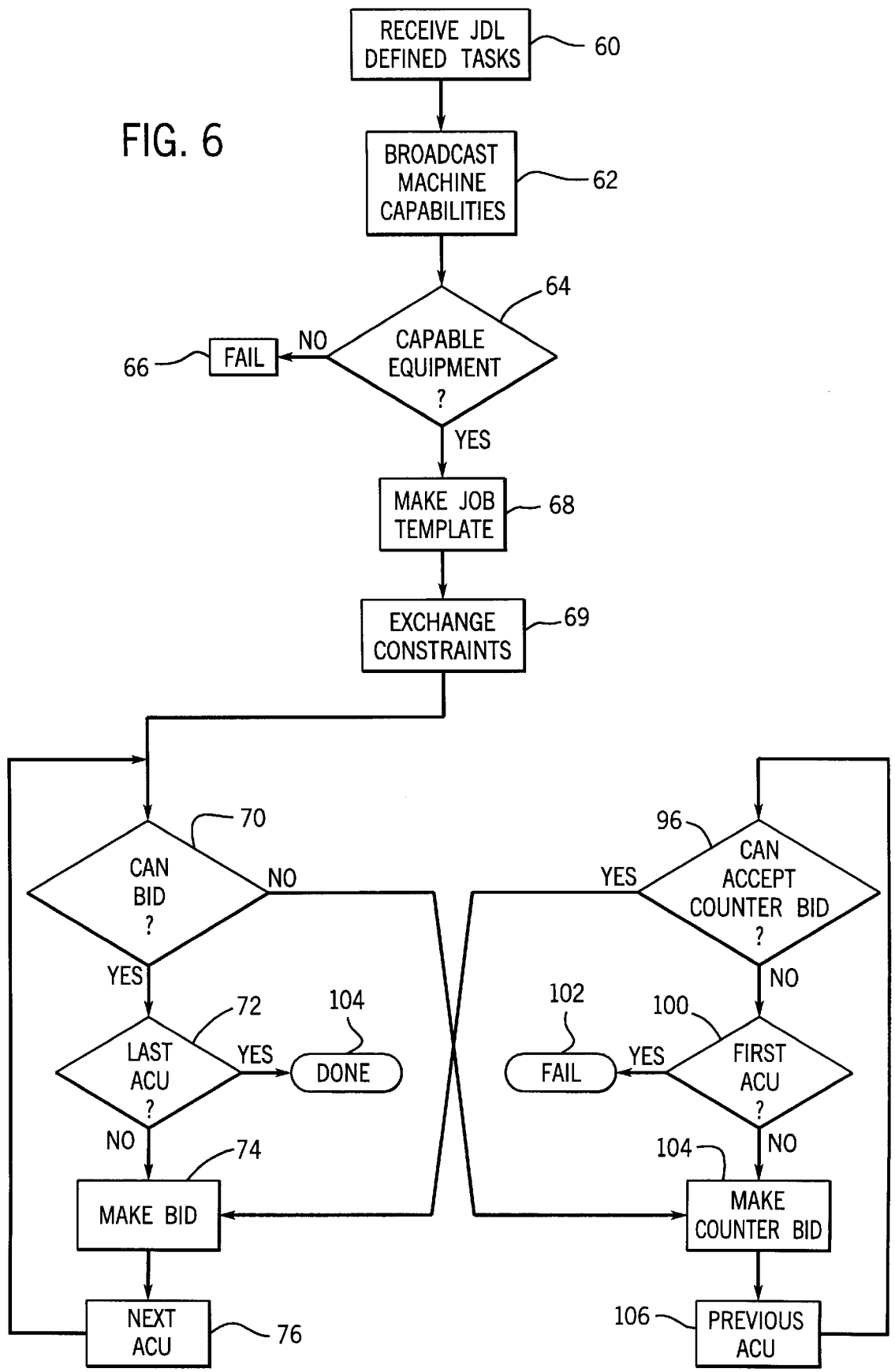
FIG. 6 is a flow chart of the bid program of FIG. 3 such as may be used to generate a control strategy for the machines of FIGS. 1 and 5.

The operation of the autonomous control units 16 (and the controller 20) will now be described with reference to the flow chart of FIG. 6. The flow chart of FIG. 6 is executed in part by different autonomous control unit 16a and the controller 20 as will be apparent from context.

At a first step, the job description language (JDL) is generated by the autonomous control unit implemented in controller 20 for the product is represented by process block 60. At succeeding process block 62 the JDL is broadcast over the communication link 18.

As indicated by decision block 64, each autonomous control unit receiving the broadcast JDL evaluates the tasks of the JDL generally in light of its own task constraints 42 and submits to the most upstream autonomous control unit 16 in the path (indicated by the path constraints 46), and in this case the reheat furnace 14a, an indication of which tasks represented by steps in the JDL, it can perform.

The most upstream autonomous control unit 16a, based on the received indications about task capability from the other autonomous control units 16, next tries to create one or more "template job plans" representing a possible allocations of tasks to machines 14. In the event that there is not at least one autonomous control unit 16 indicating an ability to perform at least each step the JDL, the most upstream autonomous control units 16a proceeds to a fail state 66 indicating that the desired product cannot be produced by the machines 14.

More typically, at process block 68, one or more job templates will be created as described. A number of different job templates may address different allocation of machines 14 to different steps of the JDL or different material flow paths in the case where the topology is not as simple as the example used herein. Or different job templates may address different products.

The job plans are then broadcast to the autonomous control units 16 which extract the path constraints 46 from the material paths contained in the job plans and establish a set of machine relationships manifest in the inter-machine constraints 48. A different set of machine relationships will be prepared for each job plan reflecting possibly different material paths and hence different machine interactions. Each autonomous control unit 16 initially is programmed with a set of ranges for the intermediate constraints 48, the ranges based on the known characteristics of the machine associated with the autonomous control unit 16, for example, a speed or temperature range which may be determined by the design of the machine 14. As indicated by process block 69, these initial ranges are then exchanged with the upstream and downstream machines sharing the same operational parameters as indicated by the inter-machine constraints 48. For example, for a first path where rolling mill 14b receives billets 12 from the reheat furnace 14(a), the oven output temperature range may be 0 to 2000 degrees substantially larger than the rolling mill 14b input temperature range of 1000 to 1200 degrees. In this case, the intersection of these two ranges 1000–1200 is adopted by the reheat oven 14a and the rolling mill 14b for this shared parameter. In contrast, for a second path where the rolling mill 14b receives billets 12 from the continuous caster 14(e), the casting process may require a narrow temperature range about 800 degrees so as to preserve pliability of the billets 12 and to prevent eruption of the cooling liquid interior. In this case, the intersection of the ranges for the continuous caster 14e and the rolling mill 14b is the single value 800. Note that if the rolling mill 14b had a smaller range in input temperature than the output of the continuous caster 14e, the smaller range of the rolling mill 14b would be adopted by the continuous caster.

The purpose of this exchange of ranges is to simplify the bidding process which is described below by enabling the autonomous control units to eliminate bids, and hence avoid the bidding process, for values outside the combined solutions space of these ranges.

After this exchange, the most upstream machine 14, either the reheat furnace 14a or the continuous caster 14e, then reads the first step of the JDL, which in this case that indicates that the temperature of the product should be raised to a value of less than 1300 degrees, and evaluates whether it can create a bid for that task as indicated by process block 70. Specifically, the autonomous control unit 16 evaluates its current temperature in its self assessment 52 and its goals 36 and the requirements of the JDL to creates a bid indicating a specific temperature to which the reheat furnace will raise the billet 12. In this case the intermediate constraints 48 are those associated with the reheat furnace 14a and material path I. Simultaneously, a similar process is performed by the continuous caster 14e for material path II.

Assuming that the autonomous control unit 16a of the reheat furnace 14a (and/or the continuous caster 14e) may make a bid within the above constraints, the program proceeds to decision block 72 to test if this is the last autonomous control unit on the job path (i.e., in either case, the Stelmor conveyor 14d). At this time it is not, and so the program proceeds to process block 74 where the bids are perfected by transmitting them to the succeeding rolling mill 14b and more generally to the autonomous control unit(s) immediately downstream from the autonomous control unit 16 making the bid. The autonomous control unit 16a also updates an internal bid storage table(not shown).

The process then proceeds to the next autonomous control unit 16b as generally shown by process block 76. The next autonomous control unit 16b, associated with the rolling mill 14b, receives the template plans and the bids proposed by the reheat furnace 14a and the continuous caster 14e. At process block 70 autonomous control unit 16b determines whether it can make a bid based on the information from the JDL and on the constraints 34, including this time, constraints from the intermediate constraint table 48 which links the input temperature or the rolling mill 14b to the output temperature of the reheat furnace 14b or continuous caster 14e depending on the bid. The modification of the intermediate constraint table 48 to reflect the restraints of adjacent machines makes this generation of the bids more robust against constraints of the other machines and thus less likely to trigger time consuming counter bids. Nevertheless, because the counterbid process strives to preserve the range of the intermediate constraint table 48, the autonomous control unit making the bid can exercise some influence on the job plan from its unique goals.

In the example given, the JDL requires that the temperature of the billet 12 be greater than 825 degrees at the end of the rolling. Assuming for the moment that the temperature selected by the reheat furnace 14a is insufficient for the rolling mill 14b to reach the required output temperature (as may be determined by model 40 for the rolling mill 14b) then at process block 70 the autonomous control unit 16b proceeds to process block 104 to generate a counter-bid because no bid could be generated meeting the then existent constraints.

For the counter-bid, the autonomous control unit 16b must first determine a acceptable input temperature to the rolling mill 14b. Generally this cannot be done by consulting stored input constraints for temperature because the relevant constraints will dynamically depend on the particular output temperature required. Accordingly the program 32 of the autonomous control unit 16b must refer to the model 40.

Referring now to FIG. 7, the process of determining the necessary input temperature (or an arbitrary input value from a defined output) begins at a process block 82 in which the new defined output condition is established. In this example the output condition is a temperature of greater than 825 degrees as required by the JDL.

At decision block 84, a unconstrained input is identified, in this case an input temperature from the reheat furnace 14a within temperature range permitted by the rolling mill 14b. By unconstrained it is meant that the input may be varied in a desired direction without violating the inputs constraints 44.

At process block 86, the identified input is modified, in a direction to reduce the difference between the desired output value (per the JDL and process block 82) and the modeled output value produced by evaluating the model 40 with the unmodified input. The modified input is then evaluated by executing the model 40 as indicated at process block 88 to produce a new output.

At decision block 90, the current output from the model 40 is matched to the desired new output from process block 82 and if the outputs match within a tolerance the modified input established at process block 86 is used for the counter-bid as indicated by process block 92. The counterbid incorporates a new range for the input rather than a single input value so as to preserve the flexibility of the autonomous control units accepting the counter bid as much as possible. If the modification of the input was downward, then the input becomes the new upper boundary of the input range, whereas if the modification of the input was upward, the input becomes the new lower boundary of the range. The new range is forwarded to autonomous control units for the corresponding upstream machine as part of the counterbid.

More typically, at least initially, the outputs will not match and the program loops back to process block 84 for a second or subsequent iteration. If prior to a matching of the outputs, the input becomes constrained and there are no further inputs that can be modified the program proceeds to a fail block 94 indicating the process cannot be completed.

Referring again to FIG. 6, assuming that a suitable counter-bid can be obtained at process block 92 of FIG. 7, the counter-bid is perfected by forwarding it to the proceeding autonomous control unit 16 in this case autonomous control unit 16a for the reheat furnace 14a.

Autonomous control unit 16a receiving the counter-bid at decision 96, adopts the new range of operational parameters contained therein for its intermediate constraints associated with the particular path of the relevant job plan and then determines whether it can accept the counter-bid's new proposed output temperature range by modifying its original bid. The model 40 for the reheat furnace 14a (not shown) may be invoked to determine whether with practical inputs (per input constraints 44) the desired output temperature value can be obtained. Often a range of possible modified bids are available and one bid is selected by use of the goal 50. The counter-bid may be accepted if the autonomous control unit 16a can create a bid within the new range as indicated by process block 74. This new bid is sent to the next succeeding autonomous control unit 16b as part of the job template as before and received by autonomous control unit 16b at process block 70 as has been described. Note that because the modified intermediate constraints are always a subset of the original intermediate constraints, the new bid will also satisfy the original intermediate constraints.

Referring again to decision block 96, if the counter-bid cannot be accepted then at decision block 100 a test is performed to see it the autonomous control units 16 receiving the counter-bid is the first autonomous control unit 16. If it is, then the program proceeds to process block 102 and a failure condition is indicated as would be the case were the reheat furnace 14a receiving the counter-bid.

More typically, however, the autonomous control unit 16 receiving a counter-bid will not be the first autonomous control unit 16 and thus it is possible to make yet another counter-bid indicated by process block 104 to yet an earlier autonomous control unit 16 so as to possibly relax an earlier intermediate constraint.

Bids and counter-bids may thus ripple up and down the chain of autonomous control units 16a, 16b, 16c, and 16d and the chain of autonomous control units 16e, 16b, 16c, and 16d until at process block 72 the last autonomous control unit in the material path is successfully bids for each chain and the program proceeds to process block 104 and the completed plans are forwarded to the product autonomous control unit in the controller 20 to be evaluated.

The product autonomous control unit in controller 20 may then accept one of the plans or may change the job description in a process analogous to the counter-bidding proposal and the process may be repeated. As a result of the possibility of unresolvable bidding outcomes, the product autonomous control unit 16 normally produces a time limit on the process which if exceeded causes the process to indicate a failure.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An industrial control system for controlling an industrial process of interconnected machines operating to produce a manufactured product according to a job plan, the industrial control comprising:

a plurality of interconnected autonomous control units, one associated with each machine, the autonomous control units having (a) an electronic memory holding data representing:
  (i) machine constraints indicating constraints on an operation of a given machine resulting from limitations of the machine;
  (ii) inter-machine relationships indicating physical operating parameters of the given machine linked to physical operating parameters of another machine;
(b) an electronic computer executing a stored program to:
  (i) modify the machine constraints associated with the given machine by the machine constraints of machines related by the inter-machine relationships; and
  (ii) evaluate a feasibility of execution of a portion of a job plan for the manufacture of a product by the given machine based on the modified machine constraints whereby more rapid convergence on a solution to produce the manufactured machine is provided.

2. The industrial control system of claim 1
wherein the memory holds multiple machine constraints and inter-machine relationships identified to different material paths between machines, and
wherein the machine constraints associated with a given material path are modified by the machine constraints of only machines related by the inter-machine relationships associated with the given material path.

3. The industrial control system of claim 1
wherein a job plan defines a single material path between machines; and
wherein the evaluation of the feasibility of execution of a portion of the job plan for the manufacture of a product by the given machine is based on the modified machine constraints associated with the single material path.

4. The industrial control system of claim 1 wherein the electronic computer evaluates the feasibility of execution of a portion of the job plan by:
  (iii) in response to a job plan and bids by other autonomous control units, creating a bid for the job plan describing performance of a portion of the job plan that may be performed by the given machine according to the modified machine constraints, and in the alternative creating a counter-bid proposing further modification of the machine constraints;
  (ii) in response to counter-bids by other autonomous control units, creating a modified bid for the job plan describing performance of a portion of the job plan that may be performed by the given machine according to the modified machine constraints adjusted by the received counter-bid, and in the alternative creating a counter-bid proposing new machine constraints within the modified machine constraints.

5. The industrial control system of claim 1 wherein the inter-machine relationships match identical operating parameters that are inputs and outputs of interconnected machines.

6. The industrial control system of claim 1 wherein the machine constraints are ranges of input parameters to the given machine and wherein the other machine is prior to the given machine in a material path and wherein the given machine adopts the intersection of the input parameter range of the given machine and an output parameter range of the other machine as modified machine constraints.

7. The industrial control system of claim 1 wherein the machine constraints are ranges of output parameters to the given machine and wherein the other machine is subsequent to the given machine in the material path and wherein the given machine adopts the intersection of the output parameter range of the given machine and an input parameter range of the other machine as modified machine constraints.

8. The industrial control system of claim 1 wherein the electronic memory further includes data representing a model of the operation of the given machine and wherein the electronic computer modifies the machine constraints associated with the given machine by evaluating the machine constraints of machines related by the inter-machine relationships as processed by the model.

9. The industrial control system of claim 1 wherein the machine constraints are a range of operating parameters and the modification of the machine constraints produces a multivalues range of operating parameters that is a subset of the range of operating parameters.

10. The industrial control system of claim 1 wherein the autonomous control unit are partitions of a single computer.

11. The industrial control system of claim 1 wherein the autonomous control unit are separate individual computers communicating on a common communication link.

* * * * *